(12) United States Patent
Delbet et al.

(10) Patent No.: US 7,661,943 B2
(45) Date of Patent: Feb. 16, 2010

(54) MOLD FOR VULCANIZING AN UNVULCANIZED TIRE BLANK

(75) Inventors: Cédric Delbet, Chamalieres (FR);
Olivier Lauwers, Yronde et Buron (FR);
Gérard Alegre, Clermont-Ferrand (FR);
José Merino-Lopez, Riom (FR);
Jean-Claude Desvignes, Gerzat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 12/342,006

(22) Filed: Dec. 22, 2008

(65) Prior Publication Data
US 2009/0162464 A1 Jun. 25, 2009

(30) Foreign Application Priority Data
Dec. 21, 2007 (FR) .................................. 07 60283

(51) Int. Cl.
*B29C 35/02* (2006.01)
*B29D 30/06* (2006.01)

(52) U.S. Cl. ...................................... 425/37
(58) Field of Classification Search .................. 425/37, 425/46
See application file for complete search history.

(56) References Cited

U.S. PATENT DOCUMENTS

| | | | | |
|---|---|---|---|---|
| 1,599,772 A | * | 9/1926 | Krusemark | 425/37 |
| 1,604,450 A | * | 10/1926 | Krusemark | 425/37 |
| 1,604,452 A | * | 10/1926 | Krusemark | 425/37 |
| 1,718,631 A | * | 6/1929 | Brundage | 425/37 |
| 1,733,064 A | | 10/1929 | Lambert | |
| 1,778,071 A | * | 10/1930 | Fleiter | 425/37 |
| 2002/0142056 A1 | | 10/2002 | Aperce et al. | |
| 2005/0224151 A1 | | 10/2005 | de Benedittis et al. | |
| 2005/0253304 A1 | | 11/2005 | Menard | |
| 2007/0077320 A1 | | 4/2007 | Delbet et al. | |

FOREIGN PATENT DOCUMENTS

| | | | |
|---|---|---|---|
| JP | 2002-307442 | * | 10/2002 |
| WO | WO 01/02147 | | 1/2001 |

* cited by examiner

*Primary Examiner*—James Mackey
(74) *Attorney, Agent, or Firm*—Cohen Pontani Lieberman & Pavane LLP (57) ABSTRACT

A mold for vulcanizing an unvulcanized tire blank comprises: two axial members each carrying a molding surface for molding a sidewall of the tire, at least one of the axial members being movable between a position for molding the sidewall and a position for unmolding the tire; at least one molding member for molding a channel in a tread of the tire, the molding member being movable between a channel-molding position and a channel-unmolding position; and axial movement means for axially moving the channel-molding member between its molding and unmolding positions. The axial movement means include releasable connection means between the channel-molding member and the axial member.

13 Claims, 5 Drawing Sheets

MOLD FOR VULCANIZING AN UNVULCANIZED TIRE BLANK

RELATED APPLICATIONS

This application claims the priority of French patent application no. 07/60283 filed Dec. 21, 2007, the entire content of which is hereby incorporated by reference.

FIELD OF THE INVENTION

The present invention relates to the technical field of tires.

BACKGROUND OF THE INVENTION

A tire generally comprises a tread forming a surface of revolution about an axis of rotation of the tire. The tread includes in particular a design for providing the tire with good grip.

Wear of the tread causes the design to wear away, thereby reducing the grip performance of the tire.

In the particular circumstance of a tire for a vehicle of the heavy goods type, it is known to form channels in the mass of rubber forming the tread specifically for the purpose of limiting the loss of tire grip as the tread wears away. Wearing down the rubber of the tread causes the channels to become flush in the surface of the tread. The flush channels then form grooves that serve to replace at least in part the initial design of the tread that has been worn away.

It is known to fabricate a tire by vulcanizing an unvulcanized blank in a mold comprising:

top and bottom axial members (also known as "shells"), each carrying a surface for molding a sidewall of the tire; and radial segments, each carrying a surface for molding the tire tread (which molding surface is also referred to as a "liner").

At least one sidewall-molding member is movable axially between a sidewall-molding position and a tire-unmolding position, in particular so as to enable said tire to be extracted.

In order to form the channels mentioned above, the mold generally includes top and bottom sets of channel-molding members, as described for example in JP 2002 307442A. Each set of channel-molding members is axially movable between a channel-molding position and a channel-unmolding position.

In the mold described in JP 2002 307442A, the top and bottom sets of channel-molding members are secured respectively to the top and bottom axial members. Thus, moving the axial members between their sidewall-molding positions and their tire-unmolding positions causes the sets of channel-molding members to move between their channel-molding and channel-unmolding positions.

The mold described in JP 2002 307442A further includes means for guiding the channel-molding members in the mold. These guide means comprise female slides provided in the radial segments of the mold.

Each mold segment described in JP 2002 307442A comprises top and bottom halves connected respectively to the top and bottom axial sidewall-molding members by means that allow for axial relative movement between the segment halves and the axial members for molding the sidewalls.

The female slides for guiding the top set of channel-molding members are arranged in the top halves of the segments, and the female slides for guiding the bottom set of channel-molding members are arranged in the bottom halves of the segments.

The axial relative movement of each segment half relative to the corresponding axial member for molding a sidewall is limited so as to prevent the channel-molding members from disengaging from their guiding slides when the channel-molding members are moved from their molding positions to their unmolding positions.

Thus, when the mold described in JP 2002 307442A is open, the axial movement of the sidewall-molding axial members enables the vulcanized tire to be withdrawn from the channel-molding members without disengaging the channel-molding members from the guide slides.

Nevertheless, in order to open the mold, it is necessary to move each sidewall-molding axial member together with the radial segment path to which it is connected. In addition, when closing the mold, it is necessary to take care that the junction between the radial segment halves is properly sealed. This makes the mold relatively complex to handle.

OBJECT AND SUMMARY OF THE INVENTION

One object of the invention is to provide a mold that is easier to handle than the mold described in JP 2002 307442A.

To this end, one aspect of the invention is directed to a mold for vulcanizing an unvulcanized tire blank, the mold being of the type comprising:

two axial members each having a molding surface for molding a sidewall of the tire, at least one of the axial members being movable between a position for molding the sidewall and a position for unmolding the tire;

at least one molding member for molding a channel in a tread of the tire and movable between a position for molding the channel and a position for unmolding the channel; and axial movement means for axially moving the channel-molding member between its molding and unmolding position; the axial movement means including releasable connection means between the channel-molding member and the axial member.

By means of such a mold, the axial movement of the axial member can be performed independently of the axial movement of the channel moving member while still conserving the possibility of keeping the channel-molding members in the guide means. While the mold is being opened, the axial member can begin by being moved together with the channel-molding member, in particular for the purpose of withdrawing the molding members from the tire, and can then be moved independently of the molding member, after releasing the connection means, in particular so as to enable the tire to be extracted from the mold.

According to an optional characteristic of the mold of the invention, the mold includes guide means for guiding each molding member, which guide means comprise at least a first female slide slidably receiving the mold member forming a first male slide, the first female slide being provided in a radial segment carrying at least one molding surface for molding a tread of the tire.

The guide means enable the channel-molding members to be positioned accurately relative to the tire tread.

According to other optional characteristics of the mold of the invention:

The mold comprises:
    at least one support-forming movable member for each molding member; and
    axial guide means for the support-forming member and comprising at least one second pair of male and female slides carried by the support-forming member and the radial segment.

The releasable connection means include at least two complementary locking members forming a bolt and a keeper carried by the support-forming member and the axial member.

Advantageously, the support-forming member includes axial stroke limiter means preventing each molding member from disengaging from the first female slide when the channel-molding member is moved from its molding position towards its unmolding position.

By preventing each molding member from disengaging from the first female slide, the channel-molding members are retained in the first female slide even in the unmolding position. There is no need to reengage the channel-molding members in their guiding slides next time the mold is used.

According to an optional characteristic of the mold of the invention, the stroke limiter means of the support-forming member comprising at least complementary shoulders formed in the second female slide and the support-forming member.

Advantageously, the mold includes guide means for guiding each molding member, which guide means are movable relative to the radial segment, and further including temporary coupling means for temporarily coupling the movable guide means with the support-forming member.

The movable guide means and the temporary coupling means enable the molding members to be guided and held over a portion of the stroke of the support-forming member. The movable guide means thus prevent the molding members buckling during movement of these molding members from their unmolding position towards their molding position.

According to other optional characteristics of the mold of the invention:
  the movable guide means include at least one third female slide slidably mounted around the second male slide; and
  the temporary coupling means comprise at least two opposite radial abutments secured to the movable guide means and designed to co-operate with at least two axial abutments secured to the support-forming member and complementary with the abutments secured to the movable guide means.

In an embodiment of the invention, the mold includes at least first and second molding members carried respectively by first and second support-forming members disposed substantially symmetrically on either side of an axial midplane of the tire, the tire being assumed to be in the mold.

According to other optional characteristics of this embodiment of the invention:
  the second female slide is carried by the radial segment and is common to the first and second support-forming members; and
  the mold includes first and second axial members disposed substantially symmetrically on either side of the axial midplane, the first axial member being suitable for being connected to the first support-forming member by the releasable connection members, each radial segment comprising:
    a stationary portion axially secured to the second support-forming member; and
    a movable portion that is axially movable relative to the stationary portion, the movable portion carrying a liner for molding the tread, the mold further including securing means for axially securing the second axial member with the movable portion of the radial segment.

In an embodiment of the mold of the invention, all of the molding members of the radial segment are carried by the support-forming member.

DETAILED DESCRIPTION OF THE DRAWINGS

The invention can be better understood on reading the following description given purely by way of non-limiting example and made with reference to the drawings, in which.

DETAILED DESCRIPTION OF THE DRAWINGS

FIGS. 1 to 11 show a mold constituting a first embodiment of the invention and given overall reference 10. The mold 10 is used for vulcanizing an unvulcanized blank 12 shown in FIGS. 5 to 7 in order to obtain a vulcanized tire 14 as shown in FIGS. 1, 2, and 8 to 11.

Figures 1, 2, 3:
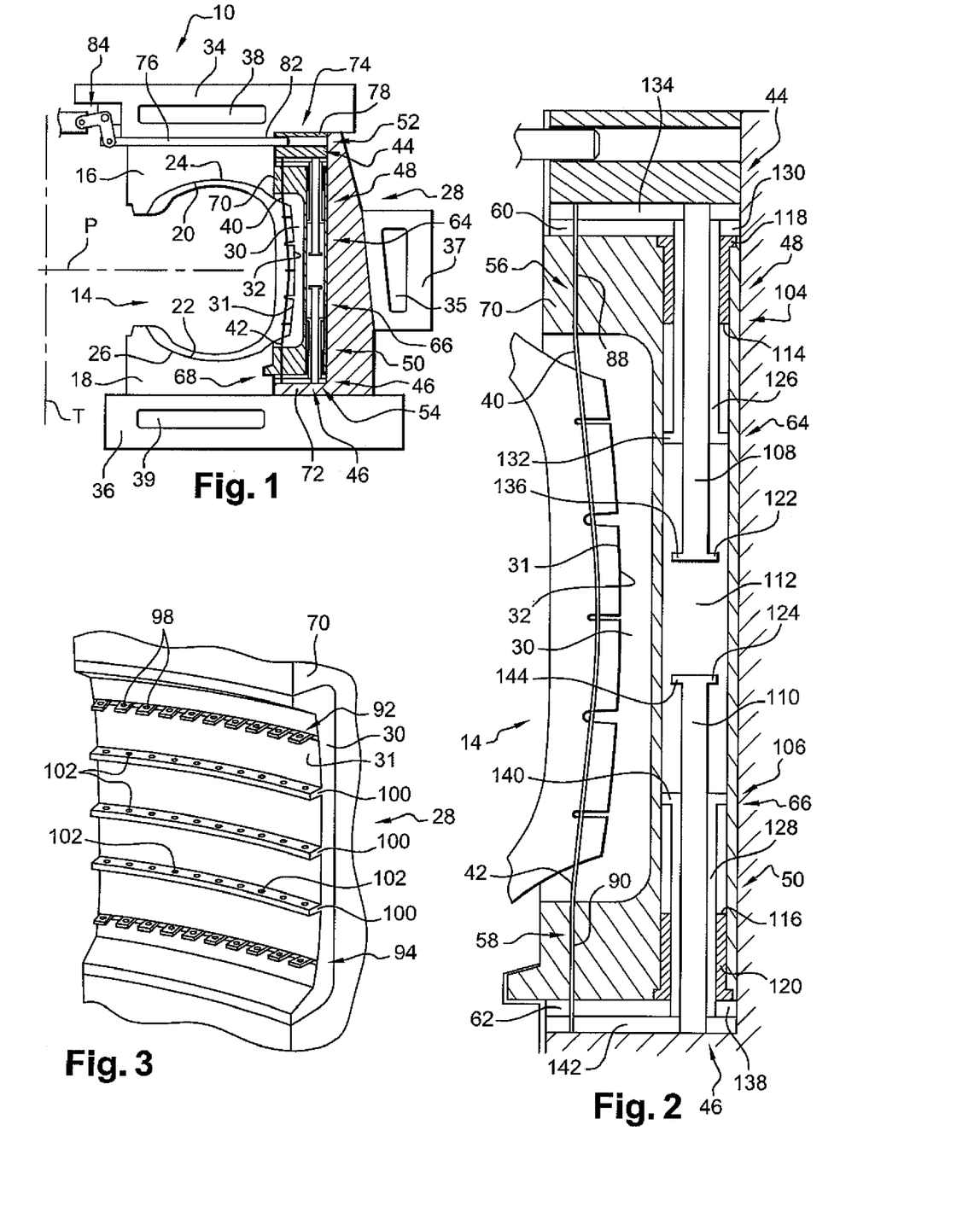
FIG. 1 is a section view of a mold for vulcanizing a tire, in a first embodiment of the invention.
FIG. 2 is a section view of a portion of a radial segment of the FIG. 1 mold.
FIG. 3 is a perspective view of a surface for molding a tread of the tire.

The mold 10 is generally in the form of a body of revolution about an axis X, shown in FIG. 1, that coincides with the axis of revolution of the tire 14 when received in the mold, as shown in FIGS. 1 to 7.

Figure 7:
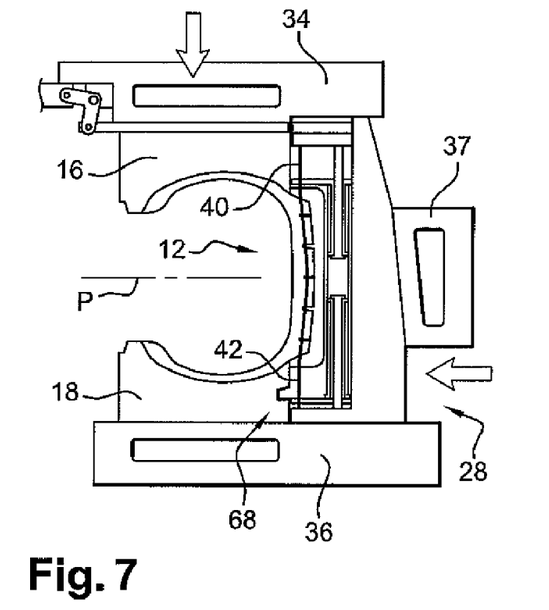
Figures 9, 10, 11:
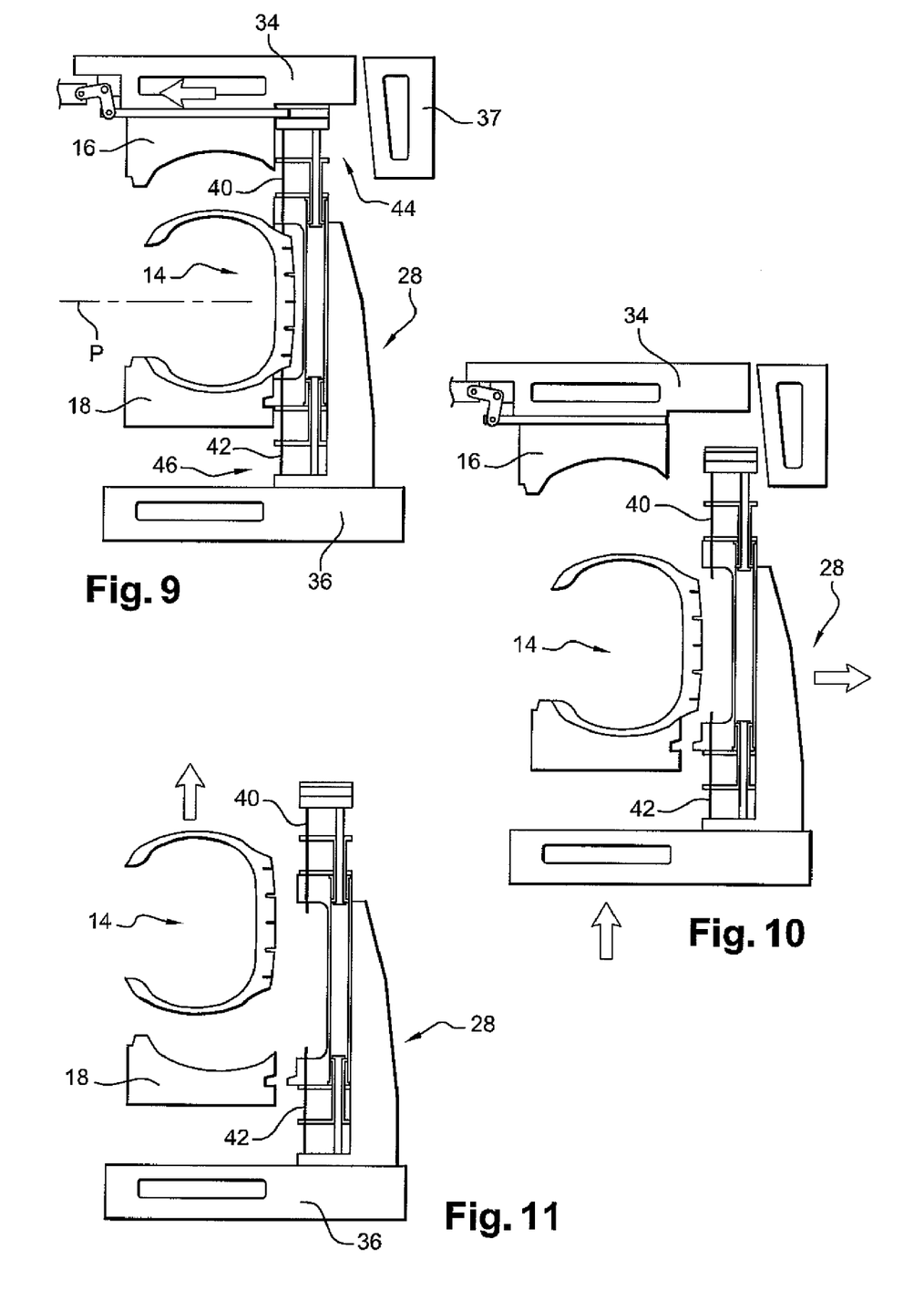

The mold 10 comprises first and second axial members 16 and 18 disposed symmetrically on either side of an axial midplane P of the tire 14 when it is in the mold, as shown in FIGS. 1, 7, and 9. The plane P is substantially perpendicular to the axis X. Each axial member 16, 18 carries a molding surface 20, 22 for molding a corresponding sidewall 24, 26 of the tire 14. Each axial member 16, 18 is movable between a position for molding the corresponding sidewall 24, 26 and a position for unmolding the tire 14.

With reference to FIGS. 1 to 3, the mold 10 also comprises radial segments 28 that are suitable for moving radially and that carry a liner 30 having a radially inner surface 31 including portions in relief for molding a tread 32 of the tire 14.

In addition, the mold 10 has first and second axially-movable clamping plates 34, 36 respectively for the first and second axial members 16, 18, and also a radial clamping ring 37 for clamping the radial segments 28. The first and second plates 34, 36 and the ring 37 have annular channels 38, 39, 35 for passing a heat-conveying fluid. Specifically, the radial segments 28 slide radially on a top surface of the second plate 36.

In addition, the mold 10 has first and second sets of first and second molding members 40, 42 for molding channels in the tread 32 of the tire 14. These two assemblies are disposed substantially symmetrically on either side of the plane P. Specifically, the members 40 and 42 are flexible needles made of steel and preferably covered in a non-stick coating.

Figure 8:
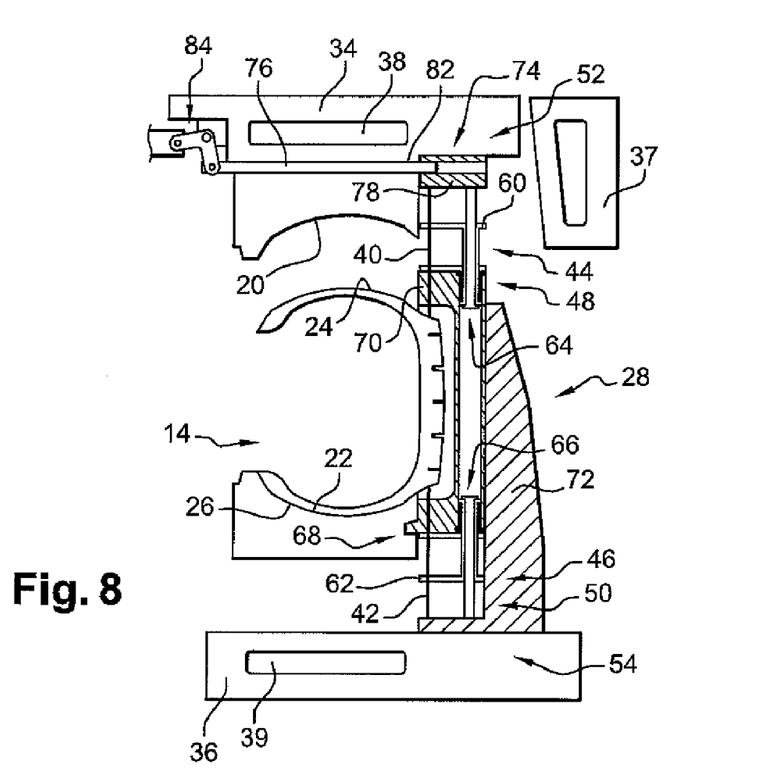
FIGS. 8 to 11 are views analogous to FIG. 1, showing the mold in different stages during opening of the mold.

With reference to FIGS. 1 and 8, the mold 10 also has first and second moving members 44 and 46 forming supports for the members 40 and 42, disposed substantially symmetrically on either side of the plane P, and also first and second axial guide means 48, 50 for axially guiding the first and second supports 44, 46 respectively. The two moving supports 44, 46 carry the two sets of molding members 40 and 42 respectively. Specifically, the second support member 46 is secured to the foot of the segment 28.

The mold 10 has first and second axial movement means 52, 54 suitable for moving the first and second sets of members 40, 42 axially between a position for molding the channels, as shown in FIGS. 1, 2, and 4 to 7, and a position for unmolding the channels, shown in FIGS. 8 to 10.

The mold 10 also has first and second guide means 56, 58 for guiding the first and second sets of molding members 40, 42 between their molding and unmolding positions, and first and second moving guide means 60, 62 for guiding each molding member 40, 42 relative to the radial segment 28.

In addition, the mold 10 has first and second temporary mechanical coupling means 64, 66 for temporarily coupling the first and second moving guide means 60, 62 mechanically respectively with the first and second supports 44, 46.

Finally, the mold 10 has means 68 for axially securing the second axial member 18 relative to a portion 70 of the radial segment 28 that carries the molding liner 30. The portion 70 is movable relative to a stationary portion 72 of the radial segment 28. In the embodiment on which the present description is based, the stationary portion 72 is axially secured to the second support 46 carrying the second molding member 42.

The first and second movement means 52 comprise releasable connection means 74 providing connections between the first axial member 16 and the first molding members 40. Specifically, the first axial member 16 can be connected to the first support 44 by using the releasable connection means 74.

The releasable means 74 comprise a bolt-forming member 76 carried by the first axial member 16, and a keeper-forming member 78 complementary to the member 76 and carried by the first support 44. The bolt 76 is movable in a housing 82 provided in the first axial member 16 between:

a locking position, shown in FIGS. 1, 2, and 8, 9 in which the bolt 76 is engaged in the catch 78; and an unlocking position, shown in FIGS. 10 and 11, in which the bolt 76 is separated from the keeper 78.

The releasable means 74 also have a crank mechanism 84 for moving the bolt 76 between its locking and unlocking positions.

With reference to FIG. 2, the first and second guide means 56, 58 include female slides 88, 90 having slidably mounted therein the first and second molding members 40, 42. These molding members 40, 42 thus form male slides co-operating with the female slides 88, 90. The female slides 88, 90 are formed in the radial segment 28, specifically in the movable portion 70.

With reference to FIG. 3, the surface 31 for molding the liner 30 for the tread 32 has one or more sets of blades 92 extending radially and disposed in continuous or discontinuous manner in the circumferential direction. Channels 98 for guiding the molding members 40, 42 are provided in the blades 92. The surface 31 of the molding liner 30 also has continuous or discontinuous circumferential fillets 100 extending radially for the purpose of molding furrows in the tread 32. Guide channels 102 for the molding members 40, 42 are provided in the continuous fillets 100. This particular arrangement as described above by way of illustration can be modified as a function of the particular requirements associated with the design of the tread.

Thus, the female slides 88, 90, and the channels 98, 102 enable the molding members 40, 42 to be held and guided during the axial movement of said molding members.

With reference to FIG. 2, the first and second supports 44, 46 respectively comprise first and second axial stroke limiter means 104, 106 that prevent the molding members 40, 42 respectively disengaging from their guiding female slides 88, 90 when these molding members 40, 42 are moved from their molding positions to their unmolding positions.

The first and second axial guide means 48, 50 respectively comprise male slides 108, 110, and female slides 112. Each female slide is common to two male slides 108, 110. The male slides 108, 110 are carried respectively by the supports 44, 46. The female slides 112 are carried by the radial segment 28 and are common to the first and second supports 44, 46.

The stroke limiter means 104, 106 of the first and second supports 44, 46 comprise first and second shoulders 114, 116 provided in each female slide 112. Specifically, each shoulder 114, 116 is carried by a ring 118, 120 inserted in the female slide 112. The stroke limiter means 104, 106 also comprise shoulders 122, 124 that are complementary to the shoulders 114, 116 and provided specifically at the ends of the male slides 108, 110 carried by the first and second supports 44, 46.

The movable guide means 60, 62 include female slides 126, 128 each mounted to slide around a male slide 108, 110.

The first temporary coupling means 64 have two opposite axial abutments 130, 132 secured to the first movable guide means 60 for co-operating with two opposite axial abutments, 134, 136 secured to the first support 44 and complementary to the abutments 130, 132. The shoulder 122 forms the abutment 136.

Likewise, the second temporary coupling means 66 include two axial abutments 138, 140 secured to the second movable guide means 62 for co-operating with two opposite axial abutments 142, 144 secured to the second support 46 and complementary to the abutments 138, 140. The shoulder 124 forms the abutment 144.

The main aspects of the operation of the mold 10 in the first embodiment of the invention are described below.

Prior to inserting the tire blank, it is appropriate to place the first and second molding members in the position for molding the channels. For this purpose, with reference to FIG. 4, the first and second axial movement means 52, 54 are actuated to move the first and second supports 44, 46 axially towards each other. The first and second molding members, guided respectively by the first and second movable guide means 60, 62, the first and second guide means 88, 90, and the guide channels 98 and 102 take up their places in the liner 30.

Figures 4, 5, 6:
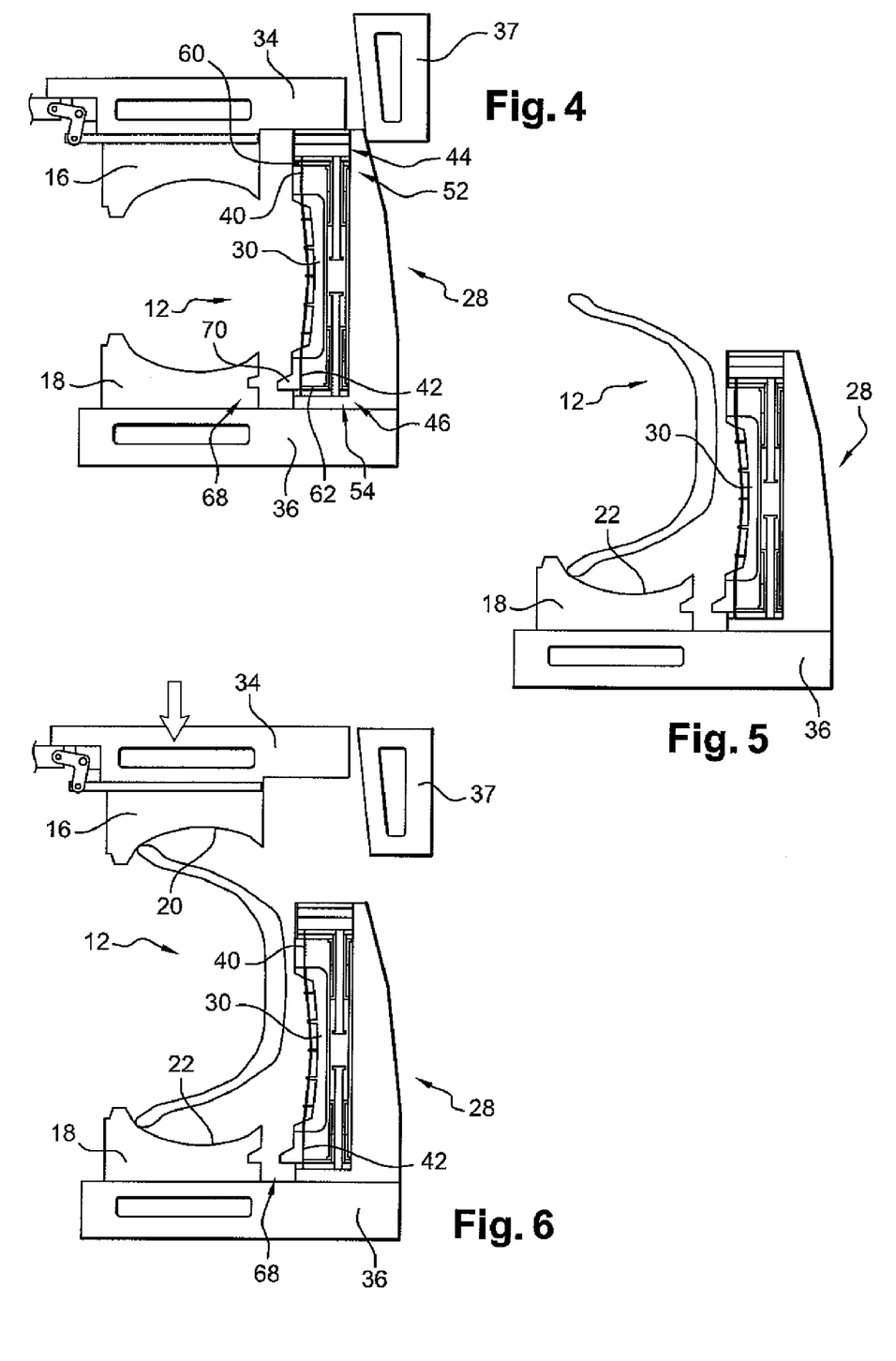
FIGS. 4 to 7 are views analogous to FIG. 1 showing the mold in different stages during closure of the mold.

Specifically, this operation is controlled by lowering the first plate 34 in the axial direction, thereby acting as axial movement means. The segments 28 are in the set-back position, thereby having the effect of disengaging the axial securing means 68 of the moving portion 70. As it moves, the first plate 34 pushes axially against the first support member 44, thereby causing the first molding members to penetrate into the liner 30. As it continues to move, the first support member 44 in turn moves the movable portion of the segment 70 carrying the liner 30, thereby causing the second mold members 42 to penetrate into the liner 30.

Simultaneously, the movable guide means 60, 62 fold until mechanical contact is established respectively between the first support 44 and the abutment 134, the abutment 134 and the abutment 130, the abutment 130 and the movable portion 70, the movable portion 70 and the abutment 138, the abutment 138 and the abutment 142, and the abutment 142 and the second support 46.

The first plate 34 is then raised so as to release the space needed for inserting the tire blank 12. Simultaneously, the second axial member 18 is lowered so as to come into contact with the second plate 36. The mold 10 is then ready to receive the tire blank 12.

In order to vulcanize the unvulcanized blank 12 in the mold 10, the blank is pressed against the surface 22 of the second axial member 18, as shown in FIG. 5.

Thereafter, with reference to FIGS. 5 to 7, the blank 12 is rounded:

by moving the axial member 16 and the clamping plate 34 axially towards the plane P so as to cause the first and second axial members 16, 18 to co-operate with the radial segments 28 and the first and second mold surfaces 20, 22 to co-operate with the surfaces of the blank 12 that are to form the sidewalls 24, 26 of the tire 14;

by moving the radial segments 28 radially towards the axis X so as to cause the molding surface 30 to co-operate with the surface of the blank 12 that is to form the tread 32 of the tire 14 and so as to connect each segment 28 to the second axial member 18 via the connection means 68; and by inflating a curing membrane (not shown) situated in the inside space of the tire blank, thereby having the effect of pressing the surface of the blank against the molding surfaces 20, 22, and 31. This pressurization also has the effect of causing the elements in relief of the tread design 92, 100, 40, 42 to penetrate into the elastomer matrix of the tread, so as to mold the channels.

Thereafter, the radial segments 28 are clamped radially to the clamping ring 37 by moving the ring 37 axially towards the plane P against the radial segments 28.

The blank 12 is then vulcanized to form the tire 14. Specifically, vulcanization is performed by causing a heat-conveying fluid to flow in the annular flow channels 38, 39, and 35 and also in the inside space of the membrane.

Once the blank 12 has been vulcanized, the molding members 40, 42 need to be withdrawn so as to unmold the tire 14. To do this, and as shown in FIG. 1, the connection means 74 are locked in such a manner as to connect together the first axial member 16 with the support 44 and the molding members 40 that it carry.

Thereafter, the clamping ring 37 is moved away axially.

Then, with reference to FIG. 8, the plate 34 and the axial member 16 are moved axially away from the plane P. The axial movement of the axial member 16 initially has the effect of moving the support 44 axially relative to the radial segment 28 to a position in which the complementary abutments 132 and 136 co-operate. Thereafter, the axial movement of the axial member 16 causes the first movable guide means 60 to move axially to the position for unmolding the first molding members for molding the channels 40, as shown in FIG. 8.

Furthermore, the plate 36 is moved axially away from the plane P. Specifically, this relative movement takes place by raising the second axial member 18, thereby entraining the movable portion 70 of the segment 28 which is secured of the axial element 18 by the means 68. Since the second member 46 is secured to the segment 28, the segment slides on the surface of the plate 36, with the axial movement relative to the plane P of the plate 36 initially having the effect of moving the movable portion 70 of the radial segment 28 relative to the support 46 to a position in which the complementary abutments 140 and 144 co-operate. This movement causes the second movable guide means 62 to move axially to the position for unmolding the second molding members 42 for molding the channels, as shown in FIG. 8.

The position for unmolding the molding members 40, 42 is determined by the stroke limiter means 104, 106. Specifically, the unmolding position is reached when the shoulders 114, 116 co-operate with the abutments 132, 140 of the movable guide means 60, 62, themselves co-operating with the abutments 136, 144 of the supports 44, 46. As a result, the molding members 40, 42 do not move out from the female slides 88, 90 carried by the moving portion 70.

Thereafter, with reference to FIG. 9, the connection means 74 are released.

With reference to FIG. 10, the first plate 34 and the axial member 16 are then moved away from the plane P. It is then possible to move the radial segments 28 away radially since the molding members 40, 42 have been withdrawn from the tread 32.

The vulcanized tire 14 is then removed from the mold 10, as shown in FIG. 11.

Figures 12, 13:
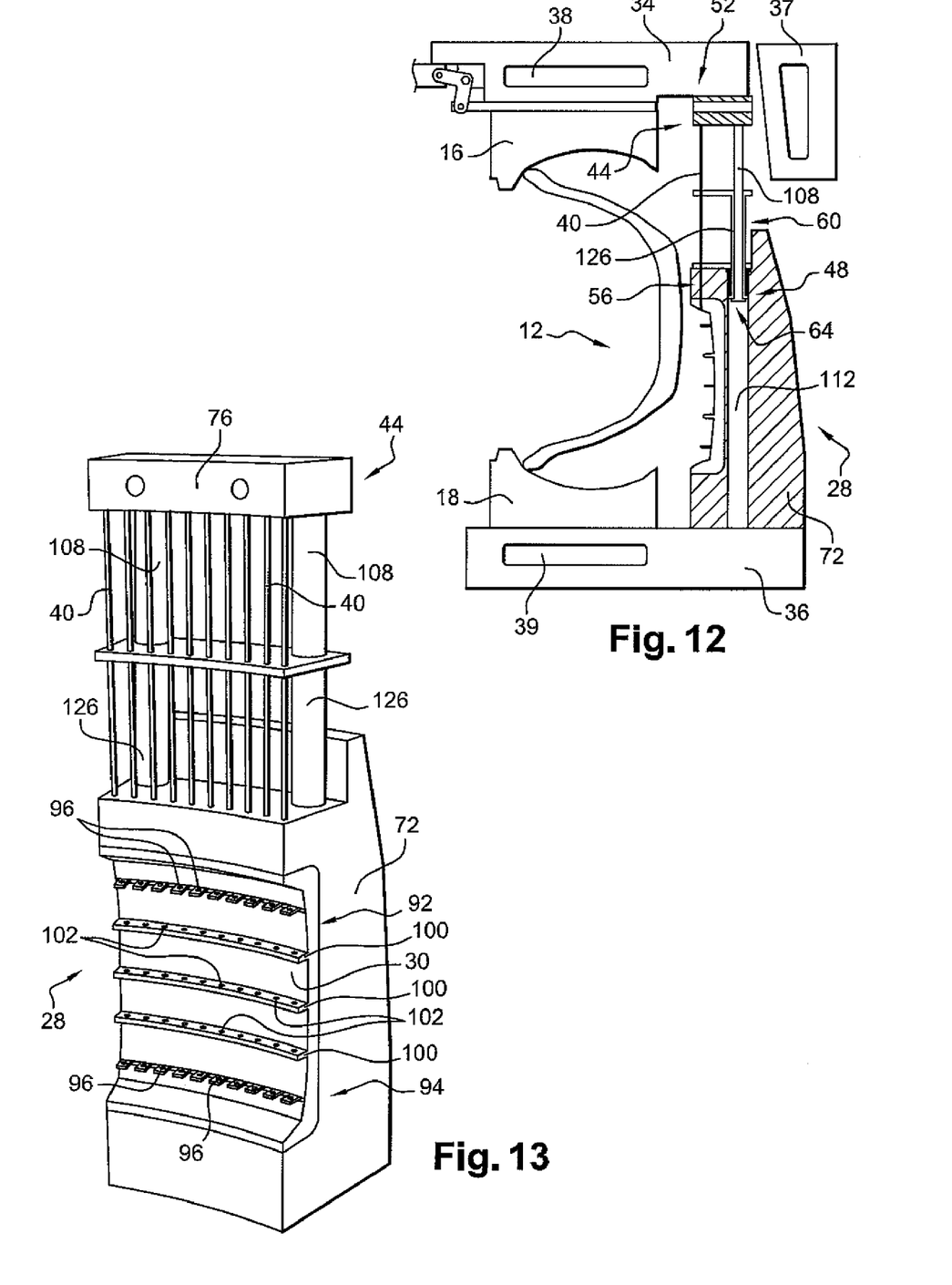
FIG. 12 is a view analogous to FIG. 6 showing a mold in a second embodiment of the invention.
FIG. 13 is a perspective view of a radial segment of the FIG. 12 mold.

FIGS. 12 and 13 show a mold constituting a second embodiment of the invention. Elements analogous to those shown in the above figures are given identical references.

Unlike the mold 10 of the first embodiment, the mold 10 of the second embodiment does not have the second molding means 42 and the means and members that are associated therewith. As a result, all of the molding members 40 of the radial segment 28 are carried by the support-forming member 4.

In addition, each radial segment 28 has a single portion 72 that is stationary relative to the segment 28.

The first molding members 40 of the mold 10 in the second embodiment pass axially through the thread 32 and present a length that is greater than the length of the first molding member 40 of the mold 10 of the first embodiment which pass axially through only half of the tread 32.

In order to be able to move the members 40 between their molding position and their unmolding position, the male slides 108 of the first axial guide means 48 and the female slides 126 of the first movable guide means present lengths that are adapted to the stroke needed for moving the molding members 40 between their molding and unmolding positions.

What is claimed is:

1. A mold for vulcanizing an unvulcanized tire blank, comprising:
    two axial members each having a molding surface for molding a sidewall of the tire, at least one of the axial members being movable between a position for molding the sidewall and a position for unmolding the tire;
    at least one molding member for molding a channel in a tread of the tire and movable between a position for molding the channel and a position for unmolding the channel; and
    axial movement means for axially moving the channel-molding member between its molding and unmolding position, wherein the axial movement means include releasable connection means between the channel-molding member and the axial member.

2. The mold according to claim 1, comprising guide means for guiding each molding member, which guide means comprise at least a first female slide slidably receiving the molding member forming a first male slide, the first female slide being provided in a radial segment carrying at least one molding surface for molding a tread of the tire.

3. The mold according to claim 2, comprising:
    at least one support-forming movable member for each molding member; and
    axial guide means for the support-forming member and comprising at least one second pair of male and female slides carried by the support-forming member and the radial segment.

4. The mold according to claim 3, wherein the releasable connection means include at least two complementary locking members forming a bolt and a keeper carried by the support-forming member and the axial member.

5. The mold according to claim 3, wherein the support-forming member includes axial stroke limiter means preventing each molding member from disengaging from the first female slide when the channel-molding member is moved from its molding position towards its unmolding position.

6. The mold according to claim 5, wherein the stroke limiter means of the support-forming member comprising at least complementary shoulders formed in the second female slide and the support-forming member.

7. The mold according to claim 3, including guide means for guiding each molding member, which guide means are movable relative to the radial segment, and further include temporary coupling means for temporarily coupling the movable guide means with the support-forming member.

8. The mold according to claim 7, wherein the movable guide means include at least one third female slide slidably mounted around the second male slide.

9. The mold according to claim 7, wherein the temporary coupling means comprise at least two opposite radial abutments secured to the movable guide means and designed to co-operate with at least two axial abutments secured to the support-forming member and complementary with the abutments secured to the movable guide means.

10. The mold according to claim 1, comprising at least first and second molding members carried respectively by first and second support-forming members disposed substantially symmetrically on either side of an axial midplane of the tire, the tire being assumed to be in the mold.

11. The mold according to claim 2, comprising at least first and second molding members carried respectively by first and second support-forming members disposed substantially symmetrically on either side of an axial midplane of the tire, the tire being assumed to be in the mold, wherein the second female slide is carried by the radial segment and is common to the first and second support-forming members.

12. The mold according to claim 11, including first and second axial members disposed substantially symmetrically on either side of the axial midplane, the first axial member being suitable for being connected to the first support-forming member by the releasable connection members, each radial segment comprising:
   a stationary portion axially secured to the second support-forming member; and
   a movable portion that is axially movable relative to the stationary portion, the movable portion carrying a liner for molding the tread, the mold further including securing means for axially securing the second axial member with the movable portion of the radial segment.

13. The mold according to claim 2, in which all of the molding members of the radial segment are carried by the support-forming member.

* * * * *